US012699347B2

(12) United States Patent
Shimohora et al.

(10) Patent No.: US 12,699,347 B2
(45) Date of Patent: Aug. 4, 2026

(54) SHEET CONVEYING DEVICE AND IMAGE FORMING APPARATUS

(71) Applicant: KYOCERA Document Solutions Inc., Osaka (JP)

(72) Inventors: Yuya Shimohora, Osaka (JP); Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/059,246

(22) Filed: Feb. 20, 2025

(65) Prior Publication Data

US 2025/0278049 A1 Sep. 4, 2025

(30) Foreign Application Priority Data

Feb. 29, 2024 (JP) ................................ 2024-029748

(51) Int. Cl.
*G03G 15/00* (2006.01)

(52) U.S. Cl.
CPC .................. *G03G 15/6564* (2013.01); *G03G 2215/00679* (2013.01); *G03G 2215/00721* (2013.01)

(58) Field of Classification Search
CPC ..... G03G 15/6564; G03G 2215/00679; G03G 2215/00721
See application file for complete search history.

(56) References Cited

U.S. PATENT DOCUMENTS 6,014,542 A 1/2000 Hozumi et al.
2014/0056630 A1* 2/2014 Kanno .............. G03G 15/6529 399/396
2015/0261160 A1 9/2015 Sato
2015/0307302 A1 10/2015 Miyamoto
2017/0123366 A1* 5/2017 Tajiri ................ G03G 15/6558
2020/0341409 A1* 10/2020 Tsujimura .......... G03G 15/1615
2021/0021716 A1* 1/2021 Hagiwara .......... H04N 1/00005
2022/0229390 A1* 7/2022 Aihara .............. G03G 15/6564
2023/0068809 A1* 3/2023 Inoue ................ G03G 15/5016
2023/0139410 A1* 5/2023 Suzuki ................ G03G 15/231 399/38

FOREIGN PATENT DOCUMENTS

JP 2003246504 A 9/2003
JP 2008225102 A 9/2008
JP 2015209297 A 11/2015

OTHER PUBLICATIONS

European Patent Office, Extended European Search Report Issued in Application No. 25158844.8, Jul. 17, 2025, Germany, 9 pages.

* cited by examiner

*Primary Examiner* — David H Banh
(74) *Attorney, Agent, or Firm* — Alleman Hall LLP

(57) ABSTRACT

A sheet conveying device includes: a conveying roller pair; a resist roller pair; a sheet sensor; a resist control unit that controls rotational driving of the resist roller pair, and a conveying speed control unit. The conveying speed control unit controls, on the basis of an elapsed time from predetermined writing timing at which light scanning on a photoreceptor drum included in an image forming unit starts to leading edge detection timing at which the sheet sensor detects a leading edge of a sheet, a rotational speed of the conveying roller pair such that a feeding amount of the sheet after the leading edge detection timing is a predetermined reference conveying amount.

2 Claims, 7 Drawing Sheets

SHEET CONVEYING DEVICE AND IMAGE FORMING APPARATUS

INCORPORATION BY REFERENCE

This application is based upon and claims the benefit of priority from the corresponding Japanese Patent Application No. 2024-029748 filed on Feb. 29, 2024, the entire contents of which are incorporated herein by reference.

FIELD

The present disclosure relates to a sheet conveying device capable of conveying a sheet and an image forming apparatus including this sheet conveying device.

BACKGROUND

Image forming apparatuses such as a printer, a copier, a facsimile machine, and a multifunction device having these functions are equipped with sheet conveying devices that convey sheets such as printing paper to the image transfer position. Existing sheet conveying devices include a resist roller pair for performing a resist operation (referred to also as registration) on the sheet. The resist operation is an operation of pressing the leading edge of the sheet against the nip portion of the resist roller pair being stopped and causing the upstream-side conveying roller to continuously convey the sheet in this state, thereby forming a deflection in the sheet and correcting the inclination of the sheet being conveyed.

When deflection is formed to such an extent that the inclination of the sheet can be corrected, the conveying roller is stopped, and then, the resist roller pair and the conveying roller are driven to rotate such that the sheet is fed out at predetermined feed timing that matches transfer start timing at which the transfer of an image to the sheet starts at the image transfer position.

Further, in the past, an image forming apparatus that causes the resist roller pair to be driven to rotate at the feed timing by decelerating the conveying roller by the feed timing and causes the conveying roller to be continuously driven to rotate in synchronization with the rotational speed of the resist roller pair without stopping the conveying roller has been disclosed. By controlling the rotation of the conveying roller in this way, the time loss at the time of re-driving of the conveying roller after a temporary stop is eliminated.

SUMMARY

A sheet conveying device according to an aspect of the present disclosure includes a conveying roller pair that conveys a sheet toward an image transfer position at which a toner image formed by an image forming unit is transferred to the sheet; a resist roller pair that is provided between the image transfer position and the conveying roller pair; a sheet sensor that is provided between the resist roller pair and the conveying roller pair and detects a leading edge of the sheet; a resist control unit that controls rotational driving of the resist roller pair such that the sheet is conveyed by the conveying roller pair while the resist roller pair is stopped to deflect the sheet whose leading edge has reached the resist roller pair and then the sheet is fed out at predetermined feed timing in accordance with transfer start timing at which transfer of the toner image to the sheet starts at the image transfer position; and a conveying speed control unit that controls, on a basis of an elapsed time from predetermined writing timing at which light scanning on a photoreceptor drum included in the image forming unit starts to the leading edge detection timing at which the sheet sensor detects the leading edge of the sheet, a rotational speed of the conveying roller pair such that a feeding amount of the sheet after the leading edge detection timing is a predetermined reference conveying amount.

An image forming apparatus according to another aspect of the present disclosure includes: the sheet conveying device, a toner image being transferred to a sheet conveyed by the sheet conveying device to an image transfer position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings as appropriate. The embodiments described below are merely examples embodying the present disclosure and do not limit the technical scope of the present disclosure.

Figure 1:
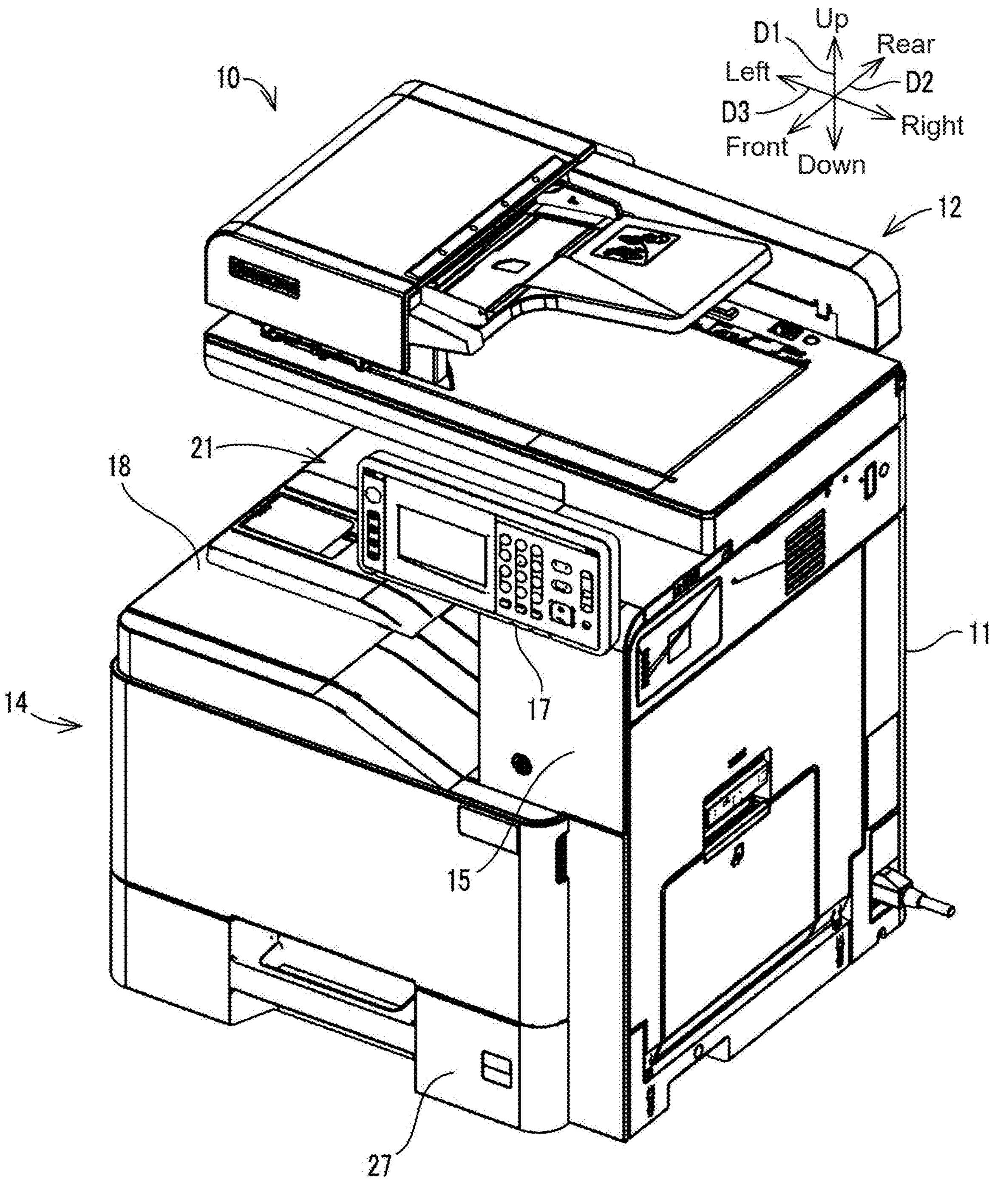
FIG. 1 is a perspective view showing a configuration of an image forming apparatus according to an embodiment of the present disclosure.
Figure 2:
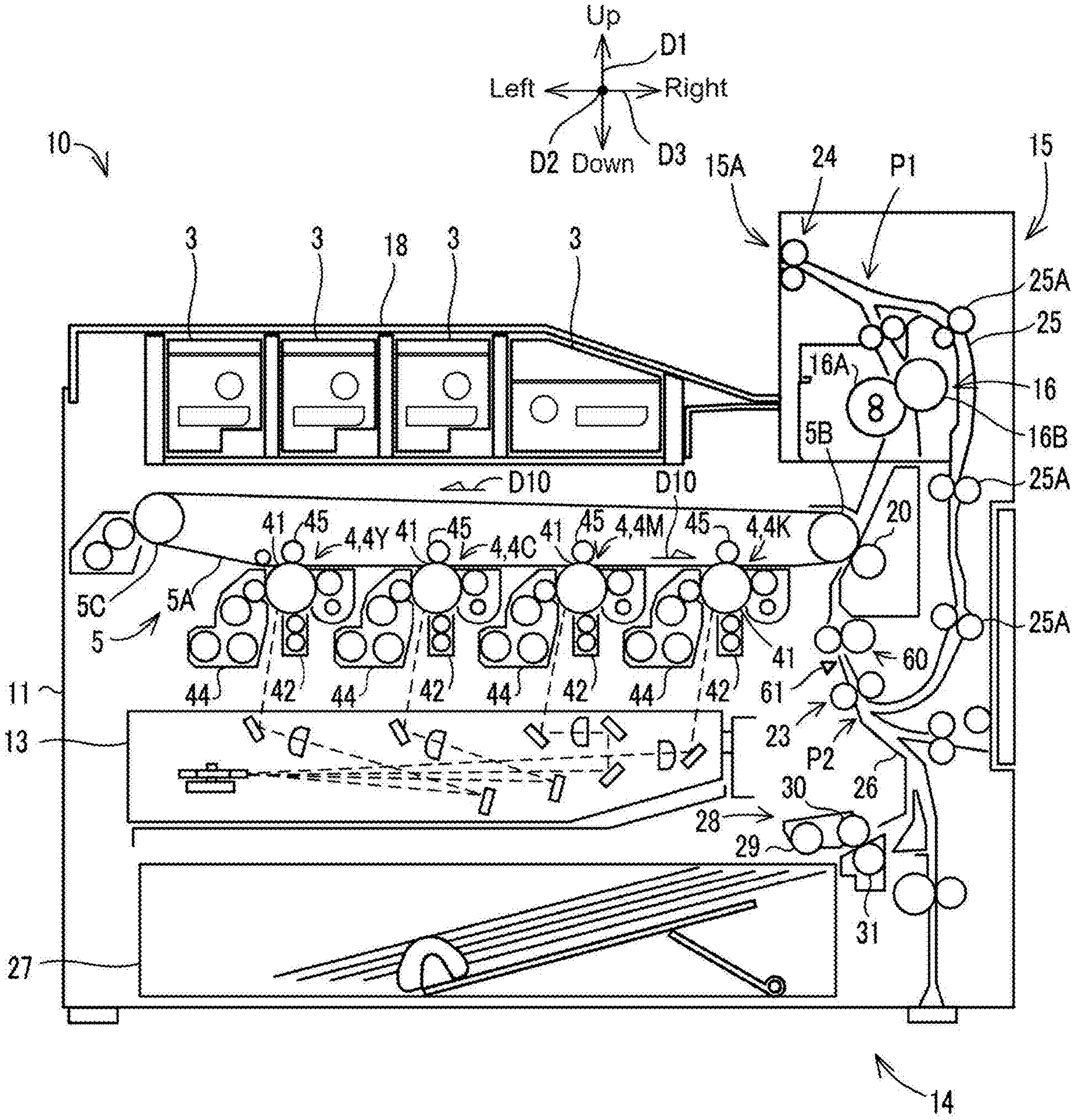
FIG. 2 is a schematic diagram showing an internal configuration of the image forming apparatus.

FIG. 1 is a perspective view showing a configuration of an image forming apparatus 10 according to an embodiment of the present disclosure. FIG. 2 is a schematic diagram showing an internal configuration of the image forming apparatus 10. In FIG. 2, illustration of an image reading unit 12 is omitted. In the following description, an up-and-down direction D1 is defined with reference to the state in which the image forming apparatus 10 is installed to be ready for use (state in FIG. 1), a front-and-rear direction D2 is defined with the front side (front surface side) of the image forming apparatus 10 as the front, and a right-and-left direction D3 is defined with the image forming apparatus 10 viewed from the front side (front surface side).

[Image Forming Apparatus 10]

As shown in FIG. 1, the image forming apparatus 10 is a multifunction device capable of printing an image on a sheet such as printing paper and has various functions such as a printing function, a copying function, a facsimile function, and a scanning function. The image forming apparatus 10 is not limited to the multifunction device and only needs to be an apparatus having a printing function of printing an image on the conveyed sheet. For example, the image forming apparatus 10 may be a printer, a copier, or a FAX machine.

The image forming apparatus 10 includes the image reading unit 12 and an image forming unit 14. The image reading unit 12 performs image reading processing of reading an image of a document and is provided in the upper part of the image forming apparatus 10. The image forming unit 14 performs image forming processing of forming a color image on the basis of an electrophotographic method and is provided in the lower part of the image forming apparatus 10. Further, a sheet output unit 15 is provided on the right side of the image forming unit 14.

An output space 21 is provided above the image forming unit 14. The sheet output unit 15 connects the image forming unit 14 and the image reading unit 12 vertically while forming the output space 21 between the image forming unit 14 and the image reading unit 12.

The sheet output unit 15 outputs the sheet on which an image has been formed to the output space 21. A sheet output port 15A (see FIG. 2) is formed on the left side surface of the sheet output unit 15 on the side of the output space 21. The sheet is output from the sheet output port 15A.

The image forming unit 14 includes a casing 11 as a body of an apparatus. The respective units constituting the image forming unit 14 are disposed inside the casing 11. The casing 11 includes an outer frame that covers the entire image forming unit 14 and an inner frame for supporting the respective units constituting the image forming unit 14.

The image forming unit 14 forms a color image on a sheet such as printing paper on the basis of a so-called tandem method. As shown in FIG. 2, the image forming unit 14 includes a plurality of image formation units 4, an intermediate transfer unit 5, a light scanning device 13, a secondary transfer roller 20, a fixing device 16, a sheet tray 18, a sheet housing unit 27, a feeding unit 28, an operation display unit 17 (see FIG. 1), a sheet conveying path 26 (hereinafter, abbreviated as a conveying path 26), a sheet conveying unit 23, a resist roller unit 60, a toner container 3, a control unit 90 (see FIG. 4), and the like. Note that the image forming unit 14 may form a monochrome image on a sheet by one image formation unit 4. In this case, the intermediate transfer unit 5 does not necessarily need to be provided.

As shown in FIG. 2, the sheet housing unit 27 is provided at the lowest part of the image forming apparatus 10. The sheet housing unit 27 houses a plurality of sheets and is formed in, for example, a tray shape with the top opened. The sheet housing unit 27 is supported by the casing 11.

The feeding unit 28 takes the plurality of sheets stacked in the sheet housing unit 27 one sheet at a time and feeds the taken sheet toward the conveying path 26. The feeding unit 28 includes a pick-up roller 29, a feed roller 30, and a separation roller 31. The pick-up roller 29 and the feed roller 30 are provided above the right side portion of the sheet housing unit 27. The separation roller 31 is provided on the lower side of the feed roller 30 while being in contact with the roller surface of the feed roller 30. Since the separation roller 31 is provided, even if a plurality of sheets is picked up by the pick-up roller 29, only the topmost sheet of the fed sheets is separated from the other sheets by the separation roller 31.

Figure 3:
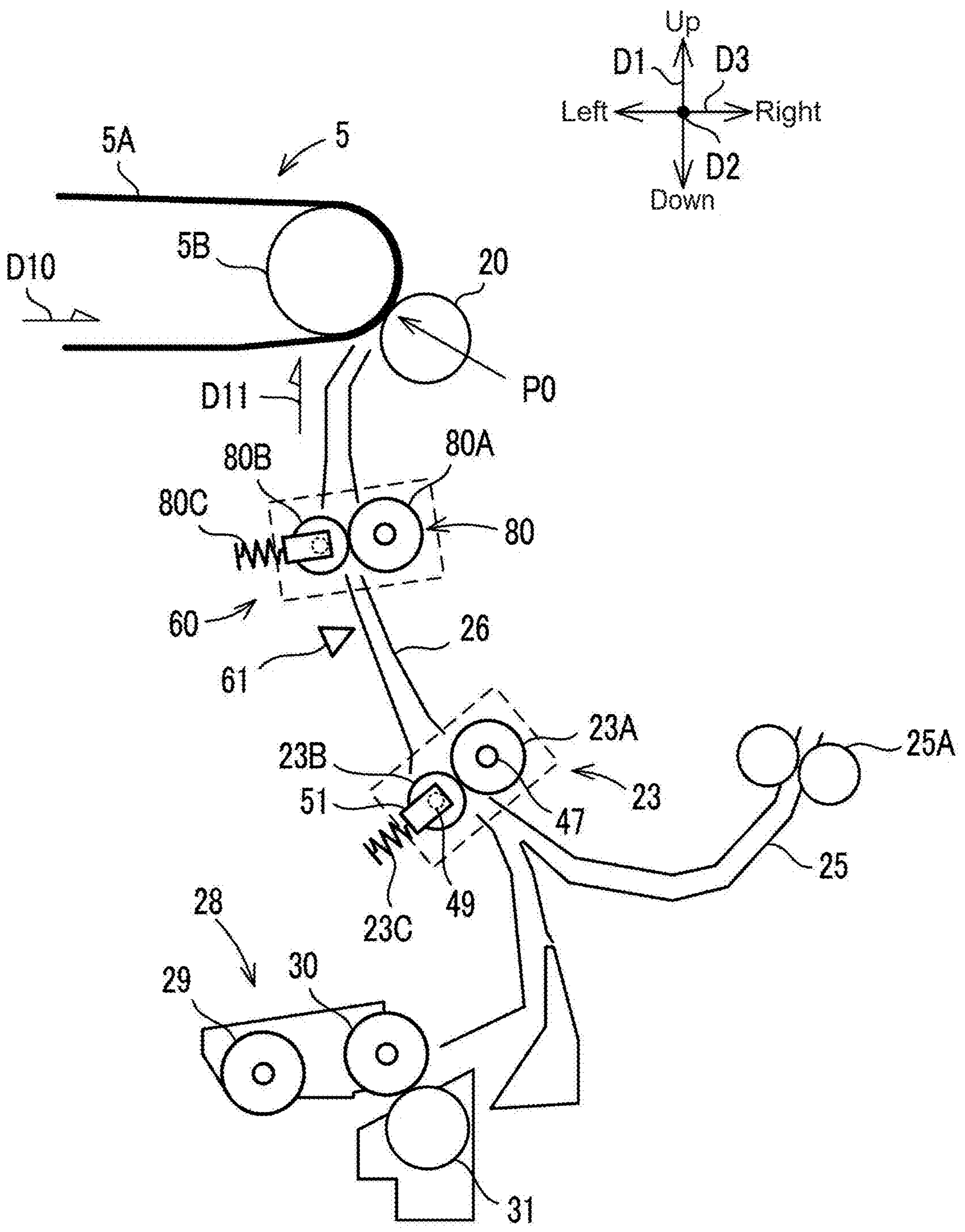
FIG. 3 is a schematic diagram showing a configuration of the periphery of a sheet conveying path of the image forming apparatus.

FIG. 3 is a schematic diagram showing a configuration of the periphery of the conveying path 26. The feed roller 30 conveys the sheet to the downstream side in a conveying direction D11 by receiving rotational driving force from a conveying motor 56 (see FIG. 4). A drive transmission mechanism (not shown) that transmits the rotation of the feed roller 30 to the pick-up roller 29 is provided between the feed roller 30 and the pick-up roller 29. The pick-up roller 29 and the feed roller 30 are connected via the drive transmission mechanism. When the feed roller 30 is caused to rotate by the conveying motor 56, the pick-up roller 29 also rotates in the same direction and at the same circumferential speed as those of the feed roller 30 by the drive transmission mechanism.

When an instruction signal for starting a feeding operation of a sheet is input to the image forming apparatus 10, the feed roller 30 and the pick-up roller 29 are caused to rotate by the rotational driving force of the conveying motor 56, and the sheet is fed from the sheet housing unit 27 to the conveying path 26. Specifically, a sheet in the sheet housing unit 27 is taken by the pick-up roller 29 and fed out to the downstream side in the feed direction, and when the tip portion of the sheet reaches the nip portion between the feed roller 30 and the separation roller 31, the feed roller 30 conveys the sheet to the conveying path 26.

The conveying path 26 is a guide path that guides the sheet fed by the feed roller 30 to the sheet output port 15A. As shown in FIG. 2, the conveying path 26 is curved upward from the feed roller 30 and then extends upward. The conveying path 26 passes through the secondary transfer roller 20 and reaches the sheet output port 15A.

As shown in FIG. 3, the sheet conveying unit 23 and the resist roller unit 60 are provided in the conveying path 26.

The sheet conveying unit 23 conveys the sheet fed to the conveying path 26 by the feeding unit 28 in the conveying direction D11 toward an image transfer position P0. The image transfer position P0 is a position where a toner image on a transfer belt 5A is transferred to the sheet and is a position where a drive roller 5B and the secondary transfer roller 20 face each other. The sheet conveying unit 23 conveys the sheet to the downstream side in the conveying direction D11 by receiving the rotational driving force from a conveying motor 57 (see FIG. 4). The configuration of the sheet conveying unit 23 will be described below.

The resist roller unit 60 is disposed upstream of the image transfer position P0 in the conveying direction D11 and downstream of the sheet conveying unit 23 in the conveying direction D11, in the conveying path 26. That is, the resist roller unit 60 is provided between the image transfer position P0 and the sheet conveying unit 23. The resist roller unit 60 corrects the inclination of the sheet conveyed through the conveying path 26 while being inclined with respect to the conveying direction D11 and conveys the corrected sheet to the downstream side in the conveying direction D11. The configuration of the resist roller unit 60 will be described below.

As shown in FIG. 2, each of the image formation units 4 is provided below the intermediate transfer unit 5. Each image formation unit 4 performs image forming processing of forming a toner image on the surface of the transfer belt 5A on the basis of image data input from the outside. The plurality of image formation units 4 is arranged along the travelling direction of the transfer belt 5A (direction indicated by an arrow D10). From the left side to the right side of the transfer belt 5A, an image formation unit 4Y for yellow, an image formation unit 4C for cyan, an image formation unit 4M for magenta, and an image formation unit 4K for black are arranged in the stated order in a single line.

Each of the image formation units 4 includes a photoreceptor drum 41, a charging device 42, a development device 44, a primary transfer roller 45, and the like. The image formation unit 4Y forms a toner image on the surface of the photoreceptor drum 41 using a yellow toner. The image formation unit 4C, the image formation unit 4M, and the image formation unit 4K respectively form toner images on the surface of the photoreceptor drum 41 with a cyan toner, a magenta toner, and a black toner. The processing of developing the toner image on the photoreceptor drum 41 is performed by the development device 44.

The intermediate transfer unit 5 includes the transfer belt 5A, the drive roller 5B, and a driven roller 5C. The transfer belt 5A is a belt member to which toner images of respective colors, which are formed on the photoreceptor drums 41 of the image formation units 4, are transferred. The transfer belt 5A is provided above the photoreceptor drum 41. The transfer belt 5A is an endless circular belt. The transfer belt 5A is rotatably supported by the drive roller 5B and the driven roller 5C provided spaced apart in the right-and-left direction D3. The transfer belt 5A is supported by being stretched over the drive roller 5B and the driven roller 50. When the surface of the transfer belt 5A passes between the photoreceptor drum 41 and the primary transfer roller 45, the toner image is transferred in order from each photoreceptor drum 41 in a superimposed manner. The toner image transferred to the transfer belt 5A is conveyed to the image transfer position P0 and is transferred to the sheet at the image transfer position P0.

The light scanning device 13 applies laser light to the photoreceptor drum 41 of each image formation unit 4 on the basis of the input image data of each color. This forms an electrostatic latent image on each photoreceptor drum 41. When an image forming instruction to form images on a plurality of sheets and pieces of image data corresponding to the respective sheets are input to the image forming apparatus 10, the control unit 90 determines scanning start timing at which laser scanning on the photoreceptor drum 41 with laser light based on the image data is started (corresponding to the writing timing in the present disclosure) and applies the laser light to the photoreceptor drum 41 at the scanning start timing determined for each of the plurality of sheets.

The secondary transfer roller 20 is provided to face the drive roller 5B with the conveying path 26 extending vertically sandwiched therebetween. The secondary transfer roller 20 performs transfer processing of transferring the toner image on the transfer belt 5A to the sheet by the transfer potential applied to the secondary transfer roller 20. The position where the secondary transfer roller 20 transfers the toner image to the sheet is the image transfer position P0. The sheet to which the toner image has been transferred is conveyed to the fixing device 16.

The fixing device 16 heats the toner image transferred to the sheet to fix the toner image to the sheet and includes a heating roller 16A and a pressure roller 16B. The sheet conveyed to the fixing device 16 is conveyed while being sandwiched between the heating roller 16A and the pressure roller 16B. During this conveyance, heat is transmitted from the heating roller 16A to the toner image transferred to the sheet to heat the toner image. This fixes the toner image to the sheet.

The sheet that has passed through the fixing device 16, on which the image has been formed, is output from the sheet output port 15A to the sheet tray 18 by output rollers 24 provided at the most downstream end of the conveying path 26.

In the image forming apparatus 10, in the case where an image is formed on both surfaces of the sheet, the sheet that has passed through the fixing device 16 and has one surface on which the image has been formed is turned over and then conveyed to the upstream side of the secondary transfer roller 20 again. In detail, the leading edge of the sheet that has one surface on which the image has been formed is exposed from the sheet output port 15A to the outside, and the output rollers 24 are stopped in this state. At this time, the rear edge of the sheet is held while being sandwiched between the output rollers 24. After that, when the output rollers 24 are driven in the reverse direction, the sheet is switched back and fed backward.

As shown in FIG. 2, in the image forming apparatus 10, a reverse conveying path 25 that branches off from a branch point P1 defined on the downstream side of the fixing device 16 in the conveying path 26 and is connected to a merging point P2 defined in the conveying path 26 is formed. The merging point P2 is defined upstream of the sheet conveying unit 23 in the conveying path 26. The sheet that has been fed backward from the sheet output port 15A is guided into the reverse conveying path 25, is conveyed by a conveying roller 25A provided in the reverse conveying path 25, merges into the conveying path 26 through the reverse conveying path 25, and is conveyed to the secondary transfer roller 20 again. After that, a toner image is transferred to the back surface of the sheet that has reached the secondary transfer roller 20, and the image is formed on the back surface of the sheet by passing through the fixing device 16. The sheet with the images formed on both surfaces thereof is output from the sheet output port 15A to the sheet tray 18 by the output roller 24 that has been returned to be driven in the forward direction.

[Sheet Conveying Unit 23]

As shown in FIG. 3, the sheet conveying unit 23 includes a conveying roller 23A that is driven to rotate by receiving driving force from the conveying motor 57 (see FIG. 4) and a driven roller 23B that is disposed while being in contact with the outer peripheral surface of the conveying roller 23A. The driving force from the conveying motor 57 is transmitted to a rotation shaft 47 of the conveying roller 23A. The conveying roller 23A and the driven roller 23B realize the conveying roller pair according to the present disclosure.

The conveying motor 57 is, for example, a stepping motor or an inner brushless motor. These motors have high speed response and high position accuracy, but requires a certain waiting time before re-driving after stopping.

A rotation shaft 49 of the driven roller 23B is biased toward the conveying roller 23A by a spring 23C with predetermined elastic force (spring force). This causes the driven roller 23B to be pressed against the conveying roller 23A. When the conveying roller 23A is driven to rotate in this state, the driven roller 23B is driven in accordance therewith.

The rotation shaft 49 of the driven roller 23B is supported by a support portion 51 provided in the guide member of the conveying path 26, or the like. In this embodiment, the driven roller 23B is supported by the support portion 51 such that it is movable between the contact position where it is in contact with the conveying roller 23A and a contact release position where it is separated from the conveying roller 23A.

Figure 4:
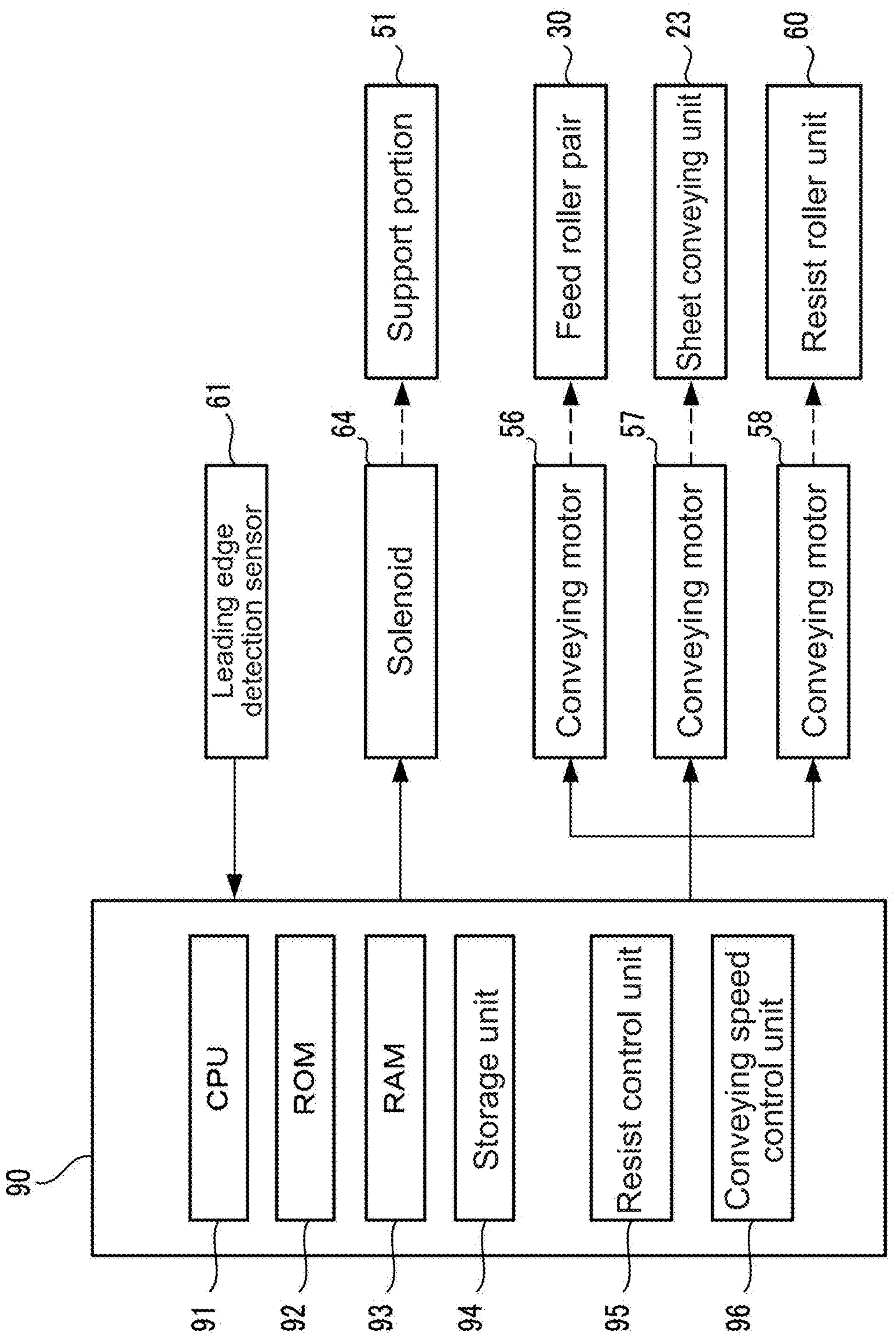
FIG. 4 is a block diagram showing a configuration of the image forming apparatus.

FIG. 4 is a block diagram showing a configuration of the image forming apparatus 10. A solenoid 64 is provided inside the casing 11. The solenoid 64 is connected to the control unit 90 and operates when energized by the control unit 90. The plunger of the solenoid 64 is connected to the support portion 51 via a linkage member (not shown). When the solenoid 64 is energized, the plunger operates to cause the support portion 51 to move from the contact position to the contact release position. When the solenoid 64 is de-energized, the plunger is returned to the original position by an extension spring provided in the solenoid 64, and the support portion 51 is returned to the contact position by the spring force of the spring 23C.

As shown in FIG. 3, in the conveying path 26, a leading edge detection sensor 61 (an example of the sheet sensor according to the present disclosure) is provided upstream of the resist roller unit 60 in the conveying direction D11 and downstream of the sheet conveying unit 23. That is, the leading edge detection sensor 61 is provided between the resist roller unit 60 and the sheet conveying unit 23. In this embodiment, the leading edge detection sensor 61 is provided at a position proximate to the resist roller unit 60.

The leading edge detection sensor 61 is provided near the center of the conveying path 26 in the width direction D2. The leading edge detection sensor 61 detects the leading edge of the sheet that has passed through the sheet conveying unit 23. The leading edge detection sensor 61 is, for example, a reflective optical sensor. The leading edge detection sensor 61 is connected to the control unit 90, and the detection signal of the leading edge detection sensor 61 is transmitted to the control unit 90. The control unit 90 detects, on the basis of the change in the detection signal transmitted from the leading edge detection sensor 61, the leading edge of the sheet conveyed through the conveying path 26. Note that since such a detection method has been known from the past, detailed description thereof is omitted.

[Resist Roller Unit 60]

As shown in FIG. 3, the resist roller unit 60 is provided in the conveying path 26. In the conveying path 26, the resist roller unit 60 is provided upstream of the image transfer position P0 in the conveying direction D11 and downstream of the leading edge detection sensor 61 in the conveying direction D11.

The resist roller unit 60 corrects the inclination (convey deviation) of the sheet conveyed while being inclined with respect to the conveying direction D11 by the sheet conveying unit 23 and conveys the corrected sheet in the conveying direction D11.

As shown in FIG. 3, the resist roller unit 60 includes a resist roller pair 80. The resist roller pair 80 includes a resist roller 80A that rotates by receiving rotational driving force from a conveying motor 58 (see FIG. 4) and a driven roller 80B that is disposed while being in contact with the outer peripheral surface of the resist roller 80A. The driving force from the conveying motor 58 is transmitted to the rotation shaft of the resist roller 80A.

The driven roller 80B is biased toward the resist roller 80A by a spring 80C. This causes the driven roller 80B to be pressed against the resist roller 80A. When the resist roller 80A is driven to rotate in this state, the driven roller 80B is driven in accordance therewith.

[Control Unit 90]

The control unit 90 controls the image forming apparatus 10, controls the operation of the sheet conveying unit 23 and the operation of the resist roller unit 60, and controls the conveying speed of the sheet by the conveying roller 23A.

As shown in FIG. 4, the control unit 90 includes a CPU 91, a ROM 92, a RAM 93, a storage unit 94, and the like. The control unit 90 is electrically connected to the respective motors 56, 57, and 58, the leading edge detection sensor 61, the solenoid 64, and the like via a signal line or the like. Note that the respective motors 56, 57, and 58 are connected to the control unit 90 and are driven and controlled by receiving individual control signals from the control unit 90.

The CPU 91 is a processor that executes a computer program to execute various types of data processing and predetermined control. The RAM 93 is a computer-readable volatile or non-volatile storage device. The RAM 93 temporarily stores the computer program to be executed by the CPU 91, data output or referred to by the CPU 91 when executing various types of processing, and the like. The ROM 92 is a non-volatile storage device that stores, in advance, a control program such as a BIOS and an OS for causing the CPU 91 to execute various types of arithmetic processing. The storage unit 94 is a flash memory that stores various types of information. The storage unit 94 stores the control program for executing various types of processing by the control unit 90, and data, a threshold value, a reference value, and the like to be used for various types of processing. Note that the storage unit 94 may be a non-volatile storage device such as an HDD and an SSD connected to the control unit 90.

Incidentally, in the image forming apparatus 10, when the sheet enters between the resist roller pair 80, slow-down control of slowing down the conveying speed of the sheet at predetermined timing is performed in some cases. For example, when the timing of starting the slow-down control is changed in accordance with the timing at which the leading edge detection sensor 61 detected the leading edge of the sheet, the degree of delay caused by slipping or the like before the sheet reaches the leading edge detection sensor 61 is not reflected in the above processing of changing the start timing, which can cause a problem that the deflection amount of the sheet varies for each sheet.

In this embodiment, the control unit 90 determines the deceleration start timing at which the deceleration of the sheet starts. This makes it possible to prevent the deflection amount from varying when the sheet is conveyed.

The control unit 90 executes, when the CPU 91 executes the various control programs stored in the ROM 92 or the storage unit 94 in advance, sheet conveying processing of conveying the sheet from the sheet housing unit 27 toward the image transfer position P0.

In order to execute the sheet conveying processing, the control unit 90 includes various processing units such as a resist control unit 95 and a conveying speed control unit 96, as shown in FIG. 4. Note that in this embodiment, not all of these processing units are necessarily essential and some of them can be omitted in some cases.

When the CPU 91 executes various types of arithmetic processing according to the control program, the control unit 90 functions as various processing units such as the resist control unit 95 and the conveying speed control unit 96. The control unit 90 or the CPU 91 is an example of the computer or processor that executes the control program. Note that some or all of the processing units included in the control unit 90 may include electronic circuits such as a motor driver. Further, the control program may be a program for causing a plurality of processors to function as the various processing units.

The resist control unit 95 controls the rotational driving of the resist roller 80A such that the sheet is conveyed by the sheet conveying unit 23 while the resist roller 80A of the resist roller unit 60 is stopped to deflect the sheet whose leading edge has reached the nip portion of the resist roller pair 80 and then the sheet is fed out at predetermined feed timing in accordance with the transfer start timing at which the transfer of the toner image to the sheet starts at the image transfer position P0.

Further, the conveying speed control unit 96 controls, in the case where the scanning start timing is earlier than leading edge detection timing at which the leading edge of the sheet is detected by the leading edge detection sensor 61, the rotational speed of the conveying roller 23A to control the conveying speed of the sheet such that the feeding amount of the sheet after the leading edge detection timing is a predetermined reference conveying amount, on the basis of an elapsed time Δt from the scanning start timing to the leading edge detection timing.

Figure 5:
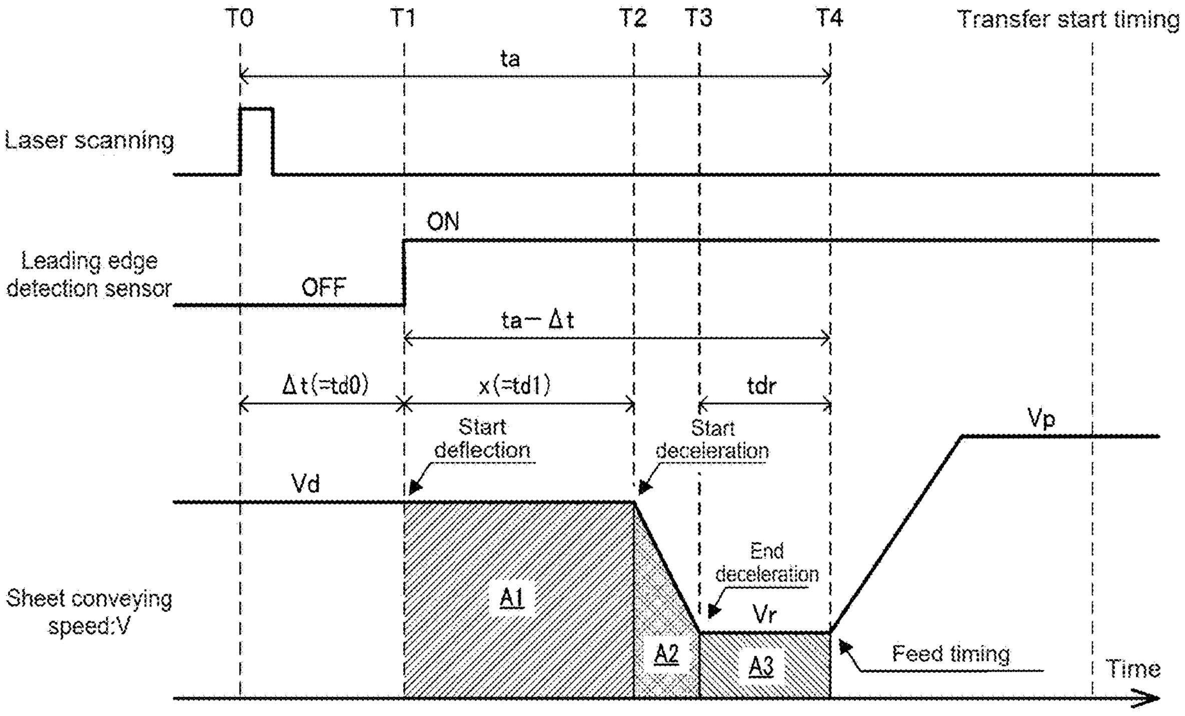
FIG. 5 is a graph showing a conveying speed V of a sheet conveyed from a sheet housing unit in the case where the sheet is conveyed under ideal conditions.

FIG. 5 is a graph showing the conveying speed V of the sheet in the case where the sheet conveyed from the sheet housing unit 27 is not delayed due to slipping or the like and is not accelerated due to the positional deviation during feeding or the like, i.e., the sheet is conveyed under ideal conditions. In this case, as shown in FIG. 5, assumption is made that the sheet is conveyed at a predetermined constant initial speed Vd and the leading edge detection timing at which the sheet was detected by the leading edge detection sensor 61 is a time point T1. The time point T1 in this case is an example of the reference timing according to the present disclosure. Assumption is made that the time point T1 is timing when an elapsed time Δt (=time td0) elapsed from a reference time point T0 that is the scanning start timing earlier than the time point T1.

The reference time point T0 is timing when laser scanning with laser light on the photoreceptor drum 41 of the image formation unit 4K located at the most downstream side of the transfer belt 5A in a travelling direction D10 starts.

In the example shown in FIG. 5, when the leading edge of the sheet conveyed at the constant initial speed Vd is detected at the time point T1 when the elapsed time Δt (=time td0) elapsed from the reference time point T0, the control unit 90 conveys the sheet at the initial speed Vd until a time point T2 (an example of the reference deceleration start timing according to the present disclosure) when a set time x (=td1) elapsed from the time point T1, starts deceleration control of linearly decelerating the conveying speed V of the sheet from the initial speed Vd to a speed Vr (low set speed) at the time point T2, and conveys the sheet at the constant speed Vr from a time point T3 when the deceleration control ends to a time point T4 that is the feed timing.

At the time point T4, the control unit 90 starts increasing the speed of the sheet by the conveying roller 23A and drives the resist roller pair 80 that has been stopped to start conveying the sheet by the resist roller pair 80. At this time, the control unit 90 drives and controls the conveying roller 23A and the resist roller 80A to linearly increase the conveying speed V of the sheet to a speed Vp (transfer conveying speed) faster than the initial speed Vd. After that, the sheet whose speed has been increased to the speed Vp is fed into the image transfer position P0 while the speed is maintained at the speed Vp.

The time from the time point T3 to the time point T4 is a low-speed set time tdr determined to convey the sheet at the low speed Vr, which is an invariant time.

Further, when the time required for the sheet to be conveyed from the reference time point T0 when laser scanning started to the time point T4 is represented by ta, the required time ta is an invariant time that does not change as long as the rotational speed of the photoreceptor drum 41 and the movement speed of the transfer belt 5A are constant, because the required time from the time point T4 to the transfer start timing when an image is transferred at the image transfer position P0 and the required time from the reference time point T0 when laser scanning started to the transfer start timing for the leading edge of the toner image on the transfer belt 5A to reach the image transfer position P0 are constant.

As shown in FIG. 5, since the resist roller 80A is stopped until the time point T4, when the deflection amount of the sheet in this case is represented by F, the deflection amount F can be expressed as the total value of the areas of a region A1, a region A2, and a region A3 in the graph of FIG. 5, i.e., it can be expressed by the following calculation formula (1).

$$\begin{aligned} F = Vd\cdot x + (Vd + Vr)(ta - tdr - x) + Vr\cdot tdr &= \\ -Vr\cdot x + Vd\cdot Ta - Vd\cdot tdr + Vr\cdot Ta &= \\ -Vr\cdot x + K(K = Vd\cdot Ta - Vd\cdot tdr + Vr\cdot Ta) \end{aligned} \tag{1}$$

The calculation formula (1) is a linear function with the set time x from the time point T1 to the time point T2 as a variable. In this embodiment, even if the leading edge detection timing varies due to a delay in the arrival of the sheet, or the like, the control unit 90 obtains the set time x using the calculation formula (1) such that the deflection amount F is a predetermined set deflection amount (constant amount), and determines the deceleration start timing at which the deflection amount F is the set deflection amount. The control unit 90 then gradually decreases the conveying speed of the sheet at the determined the deceleration start timing until the time point T3 and performs the speed control at the time point T3 and subsequent time points. As a result, even if the leading edge detection timing varies, the deflection of the set deflection amount is constantly formed in the sheet.

In this embodiment, in the example shown in FIG. 5, in the case where the leading edge detection timing is the time point T1 (reference timing), the control unit 90 obtains the set time x using the calculation formula (1), determines, as the deceleration start timing, the time point T2 (reference deceleration start timing) obtained by adding the elapsed time Δt (=td0) and the set time x to the reference time point T0, and controls the rotation of the conveying roller 23A such that the conveying speed V of the sheet starts decelerating at the time point T2.

Figure 6:
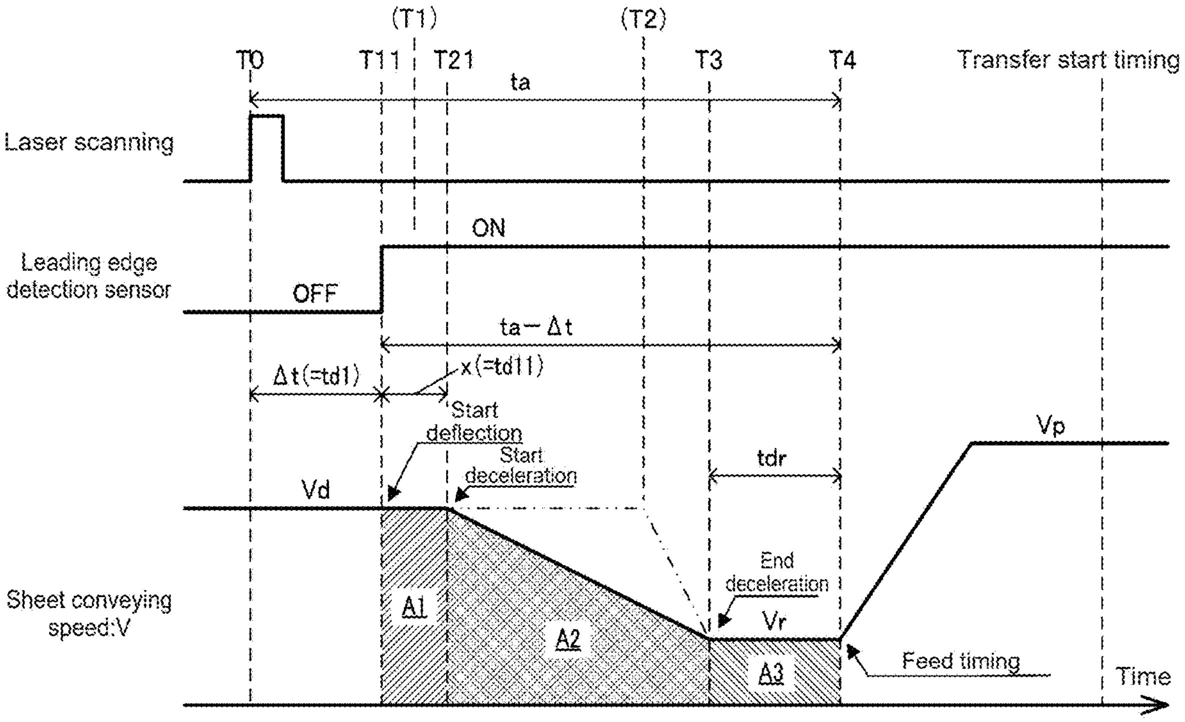
FIG. 6 is a graph showing the conveying speed V of the sheet in the case where the leading edge of the sheet conveyed at a constant initial speed is detected at a time point T11 when an elapsed time Δt (=td1) elapsed from a reference time point T0.

FIG. 6 is a graph showing the conveying speed V of the sheet in the case where the leading edge of the sheet conveyed at the constant initial speed Vd is detected at a time point T11 when an elapsed time Δt (=td1<td0) elapsed from the reference time point T0. In other words, FIG. 6 is a graph showing the conveying speed V of the sheet in the case where the leading edge of the sheet is detected earlier than the time point T1 with reference to the reference time point T0.

In the example shown in FIG. 6, the leading edge detection timing is the time point T11 earlier than the time point T1 (reference timing). In this case, the control unit 90 obtains the set time x using the calculation formula (1) and determines a time point T21 (first deceleration start timing) earlier than the time point T2 (reference deceleration start timing) by the time corresponding to the elapsed time Δt (=td1). Specifically, the control unit 90 determines, as new deceleration start timing, the time point T21 obtained by adding the elapsed time Δt (=td1) and the set time x to the reference time point T0 and controls the rotation of the conveying roller 23A such that the conveying speed V of the sheet starts decelerating at the time point T21. Even in this case, the deflection of the set deflection amount is formed in the sheet.

Figure 7:
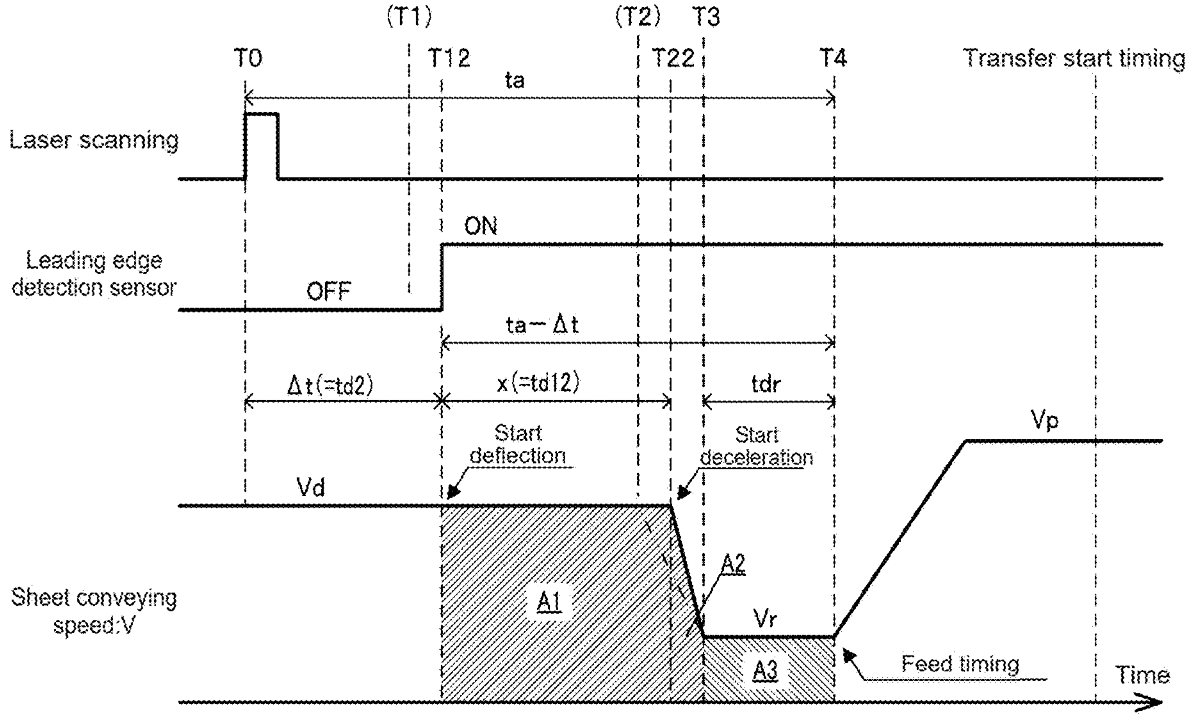
FIG. 7 is a graph showing the conveying speed V of the sheet in the case where the leading edge of the sheet conveyed at a constant initial speed is detected at a time point T12 when an elapsed time Δt (=td2) elapsed from the reference time point T0.

FIG. 7 is a graph showing the conveying speed V of the sheet in the case where the leading edge of the sheet conveyed at the constant initial speed Vd is detected at a time point T12 when an elapsed time Δt (=td2>td0) elapsed from the reference time point T0. In other words, FIG. 7 is a graph showing the conveying speed V of the sheet in the case where the leading edge of the sheet is detected later than the time point T1 with reference to the reference time point T0.

In the example shown in FIG. 7, the leading edge detection timing is the time point T12 later than the time point T1 (reference timing). In this case, the control unit 90 obtains the set time x using the calculation formula (1) and determines a time point T22 (second deceleration start timing) later than the time point T2 (reference deceleration start timing) by the time corresponding to the elapsed time Δt (=td2). Specifically, the control unit 90 determines, as new deceleration start timing, the time point T22 obtained by adding the elapsed time Δt (=td2) and the set time x to the reference time point T0 and controls the rotation of the conveying roller 23A such that the conveying speed V of the sheet starts decelerating at the time point T22. Even in this case, the deflection of the set deflection amount is formed in the sheet.

Note that the image forming apparatus 10 has been illustrated as an example of an image forming apparatus according to the present disclosure and a sheet conveying device according to the present disclosure in the above-mentioned embodiment. However, the present disclosure can be considered as a sheet conveying device including the sheet conveying unit 23, the resist roller unit 60, and the control unit 90.

[Notes of Invention]

The outline of the invention extracted from the above-mentioned embodiments will be given below. Note that the configurations and processing functions described in the following notes can be arbitrarily selected and combined.

<Note 1>

A sheet conveying device, including:

a conveying roller pair that conveys a sheet toward an image transfer position at which a toner image formed by an image forming unit is transferred to the sheet;

a resist roller pair that is provided between the image transfer position and the conveying roller pair;

a sheet sensor that is provided between the resist roller pair and the conveying roller pair and detects a leading edge of the sheet;

a resist control unit that controls rotational driving of the resist roller pair such that the sheet is conveyed by the conveying roller pair while the resist roller pair is stopped to deflect the sheet whose leading edge has reached the resist roller pair and then the sheet is fed out at predetermined feed timing in accordance with transfer start timing at which transfer of the toner image to the sheet starts at the image transfer position; and a conveying speed control unit that controls, on the basis of an elapsed time from predetermined writing timing at which light scanning on a photoreceptor drum included in the image forming unit starts to the leading edge detection timing at which the sheet sensor detects the leading edge of the sheet, a rotational speed of the conveying roller pair such that a feeding amount of the sheet after the leading edge detection timing is a predetermined reference conveying amount.

<Note 2>

The sheet conveying device according to Note 1, in which the conveying speed control unit controls rotation of the conveying roller pair such that the sheet is conveyed at a predetermined initial speed Vd until the leading edge detection timing, controls, where the leading edge detection timing is predetermined reference timing, rotation of the conveying roller pair such that a conveying speed of the sheet gradually decreases from the initial speed Vd to a low set speed Vr lower than the initial speed Vd at predetermined reference deceleration start timing, determines, where the leading edge detection timing is earlier than the reference timing, first deceleration start timing earlier than the reference deceleration start timing by a time corresponding to the elapsed time, and controls rotation of the conveying roller pair such that the conveying speed of the sheet gradually decreases from the initial speed Vd to the low set speed Vr at the first deceleration start timing, and determines, where the leading edge detection timing is later than the reference timing, second deceleration start timing later than the reference deceleration start timing by a time corresponding to the elapsed time, and controls rotation of the conveying roller pair such that the conveying speed of the sheet gradually decreases from the initial speed Vd to the low set speed Vr at the second the deceleration start timing.

<Note 3>

The sheet conveying device according to Note 2, in which the resist control unit controls rotation of the resist roller pair such that the sheet is conveyed at a transfer conveying speed Vp faster than the initial speed Vd after the feed timing, and the conveying speed control unit controls rotation of the conveying roller pair such that the sheet is conveyed at the transfer conveying speed Vp after the feed timing.

<Note 4>

An image forming apparatus, including:

the sheet conveying device according to any one of Notes 1 to 3, a toner image being transferred to a sheet conveyed by the sheet conveying device to an image transfer position.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device, comprising:

a conveying roller pair that conveys a sheet toward an image transfer position at which a toner image formed by an image forming unit is transferred to the sheet;

a resist roller pair that is provided between the image transfer position and the conveying roller pair;

a sheet sensor that is provided between the resist roller pair and the conveying roller pair and detects a leading edge of the sheet;

a resist control unit that controls rotational driving of the resist roller pair such that the sheet is conveyed by the conveying roller pair while the resist roller pair is stopped to deflect the sheet whose leading edge has reached the resist roller pair and then the sheet is fed out at predetermined feed timing in accordance with transfer start timing at which transfer of the toner image to the sheet starts at the image transfer position; and a conveying speed control unit that controls, on a basis of an elapsed time from predetermined writing timing at which light scanning on a photoreceptor drum included in the image forming unit starts to the leading edge detection timing at which the sheet sensor detects the leading edge of the sheet, a rotational speed of the conveying roller pair such that a feeding amount of the sheet after the leading edge detection timing is a predetermined reference conveying amount, wherein the conveying speed control unit:

controls rotation of the conveying roller pair such that the sheet is conveyed at a predetermined initial speed Vd until the leading edge detection timing, controls, where the leading edge detection timing is predetermined reference timing, rotation of the conveying roller pair such that a conveying speed of the sheet gradually decreases from the initial speed Vd to a low set speed Vr lower than the initial speed Vd at predetermined reference deceleration start timing, determines, where the leading edge detection timing is earlier than the reference timing, first deceleration start timing earlier than the reference deceleration start timing by a time corresponding to the elapsed time, and controls rotation of the conveying roller pair such that the conveying speed of the sheet gradually decreases from the initial speed Vd to the low set speed Vr at the first deceleration start timing, and determines, where the leading edge detection timing is later than the reference timing, second deceleration start timing later than the reference deceleration start timing by a time corresponding to the elapsed time, and controls rotation of the conveying roller pair such that the conveying speed of the sheet gradually decreases from the initial speed Vd to the low set speed Vr at the second deceleration start timing, the resist control unit controls rotation of the resist roller pair such that the sheet is conveyed at a transfer conveying speed Vp faster than the initial speed Vd after the feed timing, and the conveying speed control unit controls rotation of the conveying roller pair such that the sheet is conveyed at the transfer conveying speed Vp after the feed timing.

2. An image forming apparatus, comprising:

a conveying roller pair that conveys a sheet toward an image transfer position at which a toner image formed by an image forming unit is transferred to the sheet;

a resist roller pair that is provided between the image transfer position and the conveying roller pair;

a sheet sensor that is provided between the resist roller pair and the conveying roller pair and detects a leading edge of the sheet;

a resist control unit that controls rotational driving of the resist roller pair such that the sheet is conveyed by the conveying roller pair while the resist roller pair is stopped to deflect the sheet whose leading edge has reached the resist roller pair and then the sheet is fed out at predetermined feed timing in accordance with transfer start timing at which transfer of the toner image to the sheet starts at the image transfer position; and a conveying speed control unit that controls, on a basis of an elapsed time from predetermined writing timing at which light scanning on a photoreceptor drum included in the image forming unit starts to the leading edge detection timing at which the sheet sensor detects the leading edge of the sheet, a rotational speed of the conveying roller pair such that a feeding amount of the sheet after the leading edge detection timing is a predetermined reference conveying amount, wherein the conveying speed control unit:

controls rotation of the conveying roller pair such that the sheet is conveyed at a predetermined initial speed Vd until the leading edge detection timing, controls, where the leading edge detection timing is predetermined reference timing, rotation of the conveying roller pair such that a conveying speed of the sheet gradually decreases from the initial speed Vd to a low set speed Vr lower than the initial speed Vd at predetermined reference deceleration start timing, determines, where the leading edge detection timing is earlier than the reference timing, first deceleration start timing earlier than the reference deceleration start timing by a time corresponding to the elapsed time, and controls rotation of the conveying roller pair such that the conveying speed of the sheet gradually decreases from the initial speed Vd to the low set speed Vr at the first deceleration start timing, and determines, where the leading edge detection timing is later than the reference timing, second deceleration start timing later than the reference deceleration start timing by a time corresponding to the elapsed time, and controls rotation of the conveying roller pair such that the conveying speed of the sheet gradually decreases from the initial speed Vd to the low set speed Vr at the second deceleration start timing;

the resist control unit controls rotation of the resist roller pair such that the sheet is conveyed at a transfer conveying speed Vp faster than the initial speed Vd after the feed timing;

the conveying speed control unit controls rotation of the conveying roller pair such that the sheet is conveyed at the transfer conveying speed Vp after the feed timing; and the toner image being transferred to the sheet is conveyed by the sheet conveying device to the image transfer position.

* * * * *